(12) United States Patent
Kushihi (10) Patent No.: US 6,928,276 B2
(45) Date of Patent: Aug. 9, 2005

(54) SIGNAL RECEPTION CIRCUIT AND COMMUNICATION DEVICE HAVING THE SAME

(75) Inventor: Yuichi Kushihi, Kanazawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 429 days.

(21) Appl. No.: 10/308,121

(22) Filed: Dec. 3, 2002

(65) Prior Publication Data

US 2003/0125001 A1 Jul. 3, 2003

(30) Foreign Application Priority Data

Dec. 28, 2001 (JP) .................................. 2001-400351
Sep. 25, 2002 (JP) .................................. 2002-279421
Nov. 5, 2002 (JP) .................................. 2002-321420

(51) Int. Cl.⁷ .............................. H04B 1/06; H04B 7/00
(52) U.S. Cl. ................. 455/276.1; 455/304; 455/552.1; 455/273
(58) Field of Search ................................. 455/269, 272, 455/273, 276.1, 303, 304, 552.1, 553.1, 63.1, 67.13

(56) References Cited

U.S. PATENT DOCUMENTS

| | | | | | |
|---|---|---|---|---|---|
| 4,160,952 A | * | 7/1979 | Seastrand, Jr. | ........... | 455/276.1 |
| 4,232,399 A | * | 11/1980 | Heiter | ...................... | 455/276.1 |
| 4,384,366 A | * | 5/1983 | Kaitsuka | ................... | 455/278.1 |
| 5,564,076 A | * | 10/1996 | Auvray | ...................... | 455/553.1 |
| 6,014,571 A | * | 1/2000 | Enoki | ....................... | 455/552.1 |
| 6,546,236 B1 | * | 4/2003 | Canada et al. | .............. | 455/304 |
| 6,847,803 B1 | * | 1/2005 | Rauhala et al. | ............. | 455/63.1 |

FOREIGN PATENT DOCUMENTS

| | | |
|---|---|---|
| JP | 10-285093 | 10/1998 |
| JP | 11-150496 | 6/1999 |

\* cited by examiner

*Primary Examiner*—Quochien B. Vuong
(74) *Attorney, Agent, or Firm*—Keating & Bennett, LLP (57) ABSTRACT

A signal reception circuit includes a main antenna which receives signals in at least two predetermined reception frequency bands. A sub-antenna receives a signal in one of the reception frequency bands of the main antenna. A filter for interrupting a signal in the same frequency band as the reception frequency band of the sub-antenna is provided on a transmission line of a reception signal of the main antenna. A filter reflection signal in the same frequency band as the reception frequency band of the sub-antenna is induced in the sub-antenna, due to the antenna coupling thereof. The phase of the filter reflection signal is adjusted by a phase shifter between the main antenna and the filter, so that the induced signal of the sub-antenna is in phase with the reception signal of the sub-antenna. As a result, the level of the composed signal of the induced signal and the reception signal and is to be transmitted from the sub-antenna to a signal processing unit is greatly improved.

16 Claims, 10 Drawing Sheets

SIGNAL RECEPTION CIRCUIT AND COMMUNICATION DEVICE HAVING THE SAME

BACKGROUND OF THE INVENTION

1. Field of the Invention

The present invention relates to a signal-reception circuit for receiving a signal and outputting the signal to a signal-processing unit, and also relates to a communication device including such a signal-reception circuit.

2. Description of the Related Art

Figure 9:
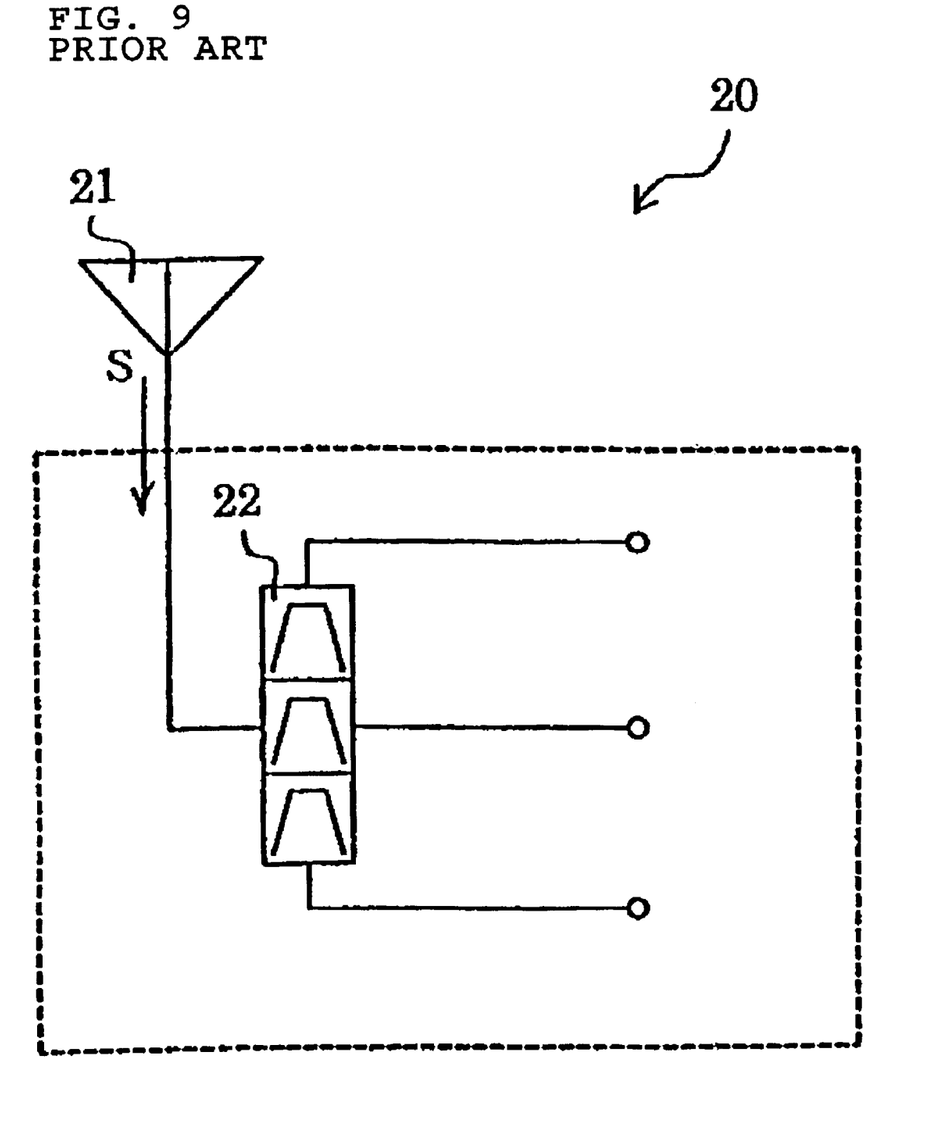
FIG. 9 illustrates a related art signal-reception circuit.

FIG. 9 shows the essential components of a signal-reception circuit for receiving a signal, e.g., in a communication device. A signal-reception circuit 20 includes a triple band type antenna 21 which can receive signals in three different frequency bands. A reception signal S output from the triple band type antenna 21 includes mixed reception signals in the three frequency bands. In this example, a triplexer 22, which is a filter, is arranged to wave-separate the reception signal S into the reception signals in the frequency bands, respectively. The triplexer 22 separates the reception signal S transmitted from the antenna 21 into the reception signals in the frequency bands and supplies the reception signals to the signal-processing units (not shown), respectively.

Specifically, in the case in which the communication device having this signal-reception circuit 20 is a portable telephone having a GPS (Global Positioning System) function, the antenna 21 is configured so as to receive a PCS (Personal Communication System) signal, an AMPS (Advanced Mobile Phone Service) signal, and a GPS signal. The triplexer 22 separates the PCS signal, the AMPS signal, and the GPS signal of a reception signal S from each other, and supplies the PCS signal to a PCS signal-processing unit, the AMPS signal to an AMPS signal-processing unit, and the GPS signal to a GPS signal-processing unit, respectively.

Japanese Unexamined Patent Application Publication No. 11-150496 will be referred to as Patent Literature 1 and Japanese Unexamined Patent Application Publication No. 10-285093 will be referred to as Patent Literature 2.

In the configuration shown in FIG. 9, the triplexer 22 is provided as a wave-separating filter. The triplexer considerably increases the insertion loss for a signal in the middle frequency band of signals in the low, middle, and high frequency bands. Therefore, the level of the signal in the middle frequency band, output from the triplexer, is reduced. Thus, the configuration of FIG. 9 has a problem in that the reception sensitivity for a signal in the middle frequency band is deteriorated.

Figure 10:
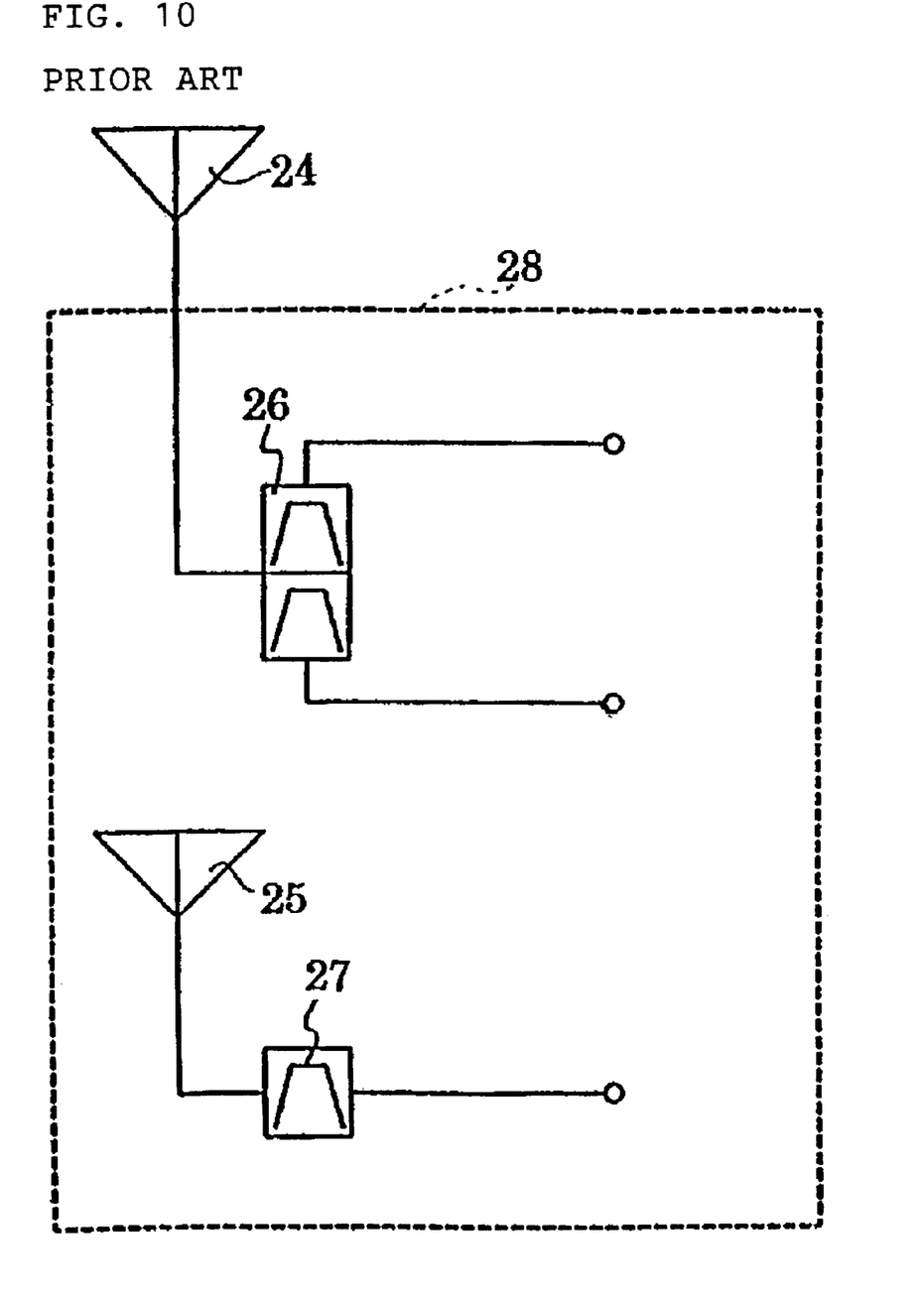
FIG. 10 illustrates another related art signal-reception circuit.

The configuration which can prevent the above-described problem is shown in FIG. 10 by way of example. According to this configuration, two antennas 24 and 25 are provided. The antenna 24 can receive, e.g., signals in two different frequency bands. The antenna 25 can receive signals in a frequency band, which is different from each of the reception frequency bands of the antenna 24.

A signal output from the antenna 24 is a mixed signal including signals in the two frequency bands. A diplexer 26 is arranged to separate the signals in the two frequency bands from each other. The diplexer 26 includes the combination of a band-pass filter for transmitting a signal in one of the reception frequency bands of the antenna 24 and a band-pass filter for transmitting a signal in the other reception frequency band of the antenna 24. Reference numeral 27 in FIG. 10 designates a band-pass filter for transmitting a signal in the reception frequency band of the antenna 25.

According to the configuration of FIG. 10, the diplexer 26 is used instead of the triplexer. This solves the problem in that the reception sensitivity for signals is deteriorated, due to the large insertion loss, which will be caused by the triplexer.

According to the above-described configuration, when the communication device is, e.g., a portable telephone, one (e.g., antenna 24) of the antennas 24 and 25 is arranged so as to project outward of a casing 28 for the communication device, and the other antenna (e, g., antenna 25) is disposed inside the casing 28. Accordingly, for operation of the portable telephone, a user grasps the casing 28, and in some cases, the antenna 25 is disturbed by the user's hand so that the reception condition of the antenna 25 is deteriorated. Thus, a problem occurs in that the reliability of the antenna for the reception sensitivity becomes low.

SUMMARY OF THE INVENTION

In order to solve the above-described problems, preferred embodiments of the present invention provide a signal-reception circuit which is constructed such that during reception of signals in at least two frequency bands, lowering of the reception sensitivities for the signals in the frequency bands is prevented, and the reliability of the antennas for the reception sensitivity is greatly improved, and also provide a communication device including such a novel signal-reception circuit.

According to preferred embodiments of the present invention, a signal-reception circuit which receives radio signals in at least two different frequency bands and outputs the signals toward signal processing units respectively includes a main antenna for receiving signals in at least two different frequency bands, a sub-antenna for receiving the signal in one reception frequency band selected from the at least two reception frequency bands of the main antenna, the main antenna and the sub-antenna being coupled to each other, a filter for interrupting the signal in the same frequency band as the reception frequency band of the sub-antenna arranged on a signal line along which a signal is transmitted from the main antenna toward a signal-processing unit, wherein the filter reflection signal in the same frequency band as the reception frequency band of the sub-antenna is induced in the sub-antenna by the antenna coupling, and the composite signal of the induced signal and the reception signal of the sub-antenna is output from the sub-antenna toward another signal-processing unit, a phasing circuit provided on a signal line between the main antenna and the filter, wherein the phasing circuit adjusts the phase of the filter reflection signal so that the signal induced in the sub-antenna is put substantially in phase with the reception signal of the sub-antenna to improve the level of the signal to be transmitted from the sub-antenna toward the signal-processing unit.

Further, according to another preferred embodiment of the present invention, a communication device includes such a signal reception circuit according to the other preferred embodiments of the present invention described above.

According to the above-described configuration, even if the reception condition of the sub-antenna is deteriorated, reduction of the level of a signal to be transmitted from the sub-antenna to the signal processing unit is prevented. Since the sub-antenna is provided, the number of signals to be wave-separated by a wave-separation circuit on a line for a reception signal of the main antenna is reduced.

Accordingly, the wave-separation circuit is easily formed, without using a triplexer. Thereby, deterioration of a signal, which may be caused by the large insertion loss of the triplexer, is avoided.

Moreover, with the above-described configuration, reduction of the reception sensitivity of a signal is prevented. Thus, a communication device with high reception sensitivity is provided.

Preferably, one of a high-pass filter, a low-pass filter, and a band-pass filter is provided as the filter. Since the configurations of these filters are simple and small in size, the signal-reception circuit and the communication device is reduced in size.

Preferably, the main antenna is configured so as to receive signals in three different frequency bands, and a diplexer is used as the filter. In this case, the diplexer interrupts the signal in one of the three, that is, high, middle, and low reception frequency bands which are mixed with each other and are output from the main antenna, and wave-separates the signals in the remaining two reception frequency bands. Therefore, it is not necessary to provide another wave-separation circuit at a subsequent stage of the filter (diplexer). Therefore, the circuit configuration of the communication device is simplified.

Preferably, the main antenna is configured so as to receive signals in three different frequency bands, a wave-separation unit such as a diplexer for wave-separating a reception signal of the main antenna is provided on a transmission line for the reception signal of the main antenna, and a phasing circuit is provided at a subsequent stage of the wave-separation unit, or between the main antenna and the wave-separation unit. In this case, the same advantages as described above can be also obtained.

Preferably, the main antenna is arranged so as to project outward of the casing of the communication device, and the sub-antenna is disposed in the casing to be accommodated. Since the sub-antenna is disposed in the casing, the signal-reception condition is ready to be deteriorated. However, according to the configuration of preferred embodiments of the present invention, reduction of the level of a signal to be transmitted from the sub-antenna to the signal processing unit is reliably prevented. Thus, even in the case of a contained-type sub-antenna, the device has a high signal-reception reliability.

Preferably, the communication device is a portable telephone having a GPS function In this case, a user uses the portable telephone by grasping the casing in his hand. Accordingly, when the sub-antenna is disposed in the casing, the signal-reception condition of the sub-antenna is often deteriorated. However, according to the configuration of preferred embodiments of the present invention, such deterioration of the reception condition of the sub-antenna is effectively prevented.

Other features, elements, characteristics and advantages of the present invention will become more apparent from the following detailed description of preferred embodiments with reference to the attached drawings.

DETAILED DESCRIPTION OF PREFERRED EMBODIMENTS

Figure 1:
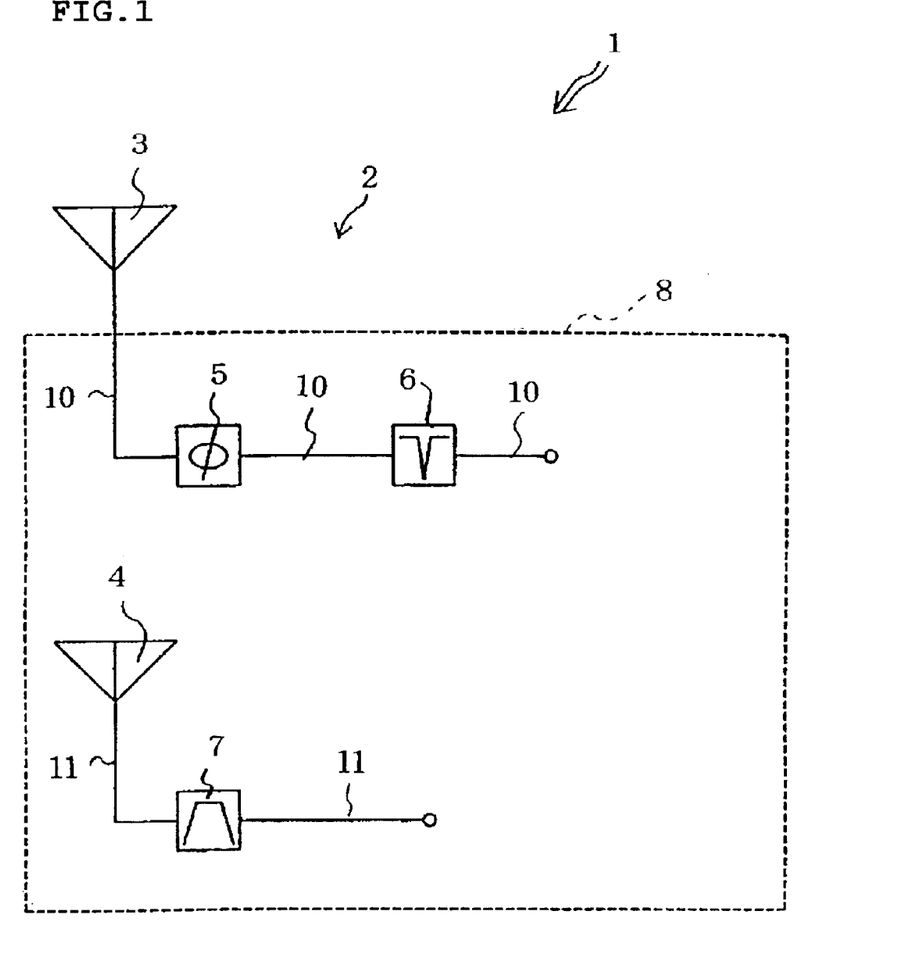
FIG. 1 illustrates a signal-reception circuit according to a first preferred embodiment of the present invention for use in communication device.

FIG. 1 is an example of the configuration of a signal-reception circuit provided in a communication device according to a first preferred embodiment of the present invention. A communication device 1 according to the first preferred embodiment is preferably a portable telephone having a GPS function. The telephone receives PCS and AMPS signals and also, a GPS signal.

According to the first preferred embodiment, a signal-reception circuit 2 relevant to the reception of a radio signal includes a main antenna 3, a sub-antenna 4, a phasing circuit 5, a trap filter 6, and a band-pass filter 7.

The main antenna 3 is arranged so as to project outward of a casing 8 of the communication device 1, and has a triple band type configuration in which the antenna 3 receives a signal in a PCS frequency band (e.g., 1.9 GHz band), a signal in a GPS frequency band (e.g., 1.5 GHz band), and a signal in an AMPS frequency band (e.g., 800 MHz band). For the triple band antenna, different configurations are available. For the main antenna 3, any of the configurations may be used.

The sub-antenna 4 is disposed in the casing 8 for the communication device 1 to be accommodated. The sub-antenna 4 is configured so as to receive a signal in one of low, middle, and high reception frequency bands (in this preferred embodiment, the middle reception frequency band (GPS frequency band)). The antenna structure of the sub-antenna 4 is not particularly restricted.

According to the first preferred embodiment, the main antenna 3 and the sub-antenna 4 are coupled to each other. For mutual coupling of the main antenna 3 and the sub-antenna 4, the interval between the main antenna 3 and the sub-antenna 4 needs to be reduced to some degree. In the case of portable telephones which have been reduced in size, the interval between the main antenna 3 and the sub-antenna 4 is so short as to be mutually coupled, irrespective of the arrangement of the antennas 3 and 4. Therefore, the arrangement relationship between the antennas 3 and 4 is not particularly restricted. The main antenna 3 and the sub-antenna 4 may be arranged considering the arrangement and positions of other circuit components, and so forth. It should be noted that shorter the interval between the antennas 3 and 4 is, stronger the coupling between the antennas 3 and 4 becomes. Accordingly, it is preferable to shorten the interval between the antennas 3 and 4.

The trap filter 6 is provided on the signal line 10 along which a reception signal from the main antenna 3 is transmitted, and is configured so as to interrupt a GPS signal (the signal is in the same reception frequency band as that of the sub-antenna 4).

The GPS signal is removed from the reception signal of the main antenna 3 (a mixed signal composed of the PCS, GPS, and AMPS signals) by the trap filter 6. A mixed signal including the other signals, that is, the PCS and AMPS signals is transmitted through the trap filter 6. The signal transmitted through the trap filter 6 is separated into the PCS and AMPS signals by a wave-separation circuit (not shown) including a duplexer, a diplexer, or other suitable device. Then, the PCS and AMPS signals are supplied to PCS and AMPS signal-processing units (not shown), respectively.

On the other hand, the GPS signal interrupted by the trap filter 6 is reflected by the filter 6. According to the first preferred embodiment, the main-antenna 3 and the sub-antenna 4 are coupled to each other. Therefore, the filter reflection signal is induced in the sub-antenna 4, due to the antenna coupling. According to the first preferred embodiment, the induced and reception signals of the sub-antenna 4 become a composite signal. The composite signal is output from the sub-antenna 4 toward a signal processing unit.

According to the first preferred embodiment, the frequency band for the reception signal of the sub-antenna 4 and that for the induced signal generated based on the filter reflection signal are the same. Therefore, if the reception signal of the sub-antenna 4 is in phase with the induced signal, the level of the signal (GPS signal) to be transmitted from the sub-antenna 4 toward the signal processing unit is improved. On the other hand, if the reception signal of the sub-antenna 4 is 180° degrees out of phase with the induced signal, the reception and induced signals will cancel out each other, so that the level of the signal (GPS signal) to be transmitted from the sub-antenna 4 to the signal processing unit is reduced.

According to the first preferred embodiment, to put the reception signal of the sub-antenna 4 in phase with the induced signal considering the above-described reduction of the level, a phasing circuit (phase shifter) 5 is provided on the signal line 10 between the main antenna 3 and the trap filter 6. That is, the phasing circuit 5 controls the phase of the filter reflection signal so that the phase of the signal to be induced in the sub-antenna 34 can be variably adjusted. The phasing quantity is set such that the induced signal of the sub-antenna 4 becomes substantially or perfectly in phase with the reception signal of the sub-antenna 4. Therefore, the level of the signal (GPS signal) to be output from the sub-antenna 4 toward the signal processing unit is greatly improved due to the adjustment of the phase of the induced signal of the sub-antenna 4 carried out by the phasing circuit 5. The signal is supplied from the sub-antenna 4 to the GPS signal processing unit (not shown) along a signal line 11 through a band-pass filter 7.

According to the first preferred embodiment, it is not necessary to provide a triplexer on the transmission line for reception signals of the antennas 3 and 4. Therefore, deterioration of the signal, which may be caused by the large insertion loss of the triplexer, is prevented.

Moreover, the sub-antenna 4 is included in the casing 8 of the communication device 1. It is possible that the casing 8 is grasped by a user's hand so that the level of the reception signal (GPS signal) is reduced. However, according to the first preferred embodiment, the GPS signal received by the main antenna 3 is induced in the sub-antenna 4, due to the mutual coupling of the main-antenna 3 and the sub-antenna 4, and also, the induced signal is put substantially in phase with the reception signal of the sub-antenna 4 by the phasing circuit 5. Thus, the level of the GPS signal (the composite signal of the reception and induced signals) to be output from the sub-antenna 4 toward the signal-processing unit is greatly improved. That is, reduction of the level of the GPS signal is prevented.

Hereinafter, a second preferred embodiment of the present invention will be described.

Figure 2:
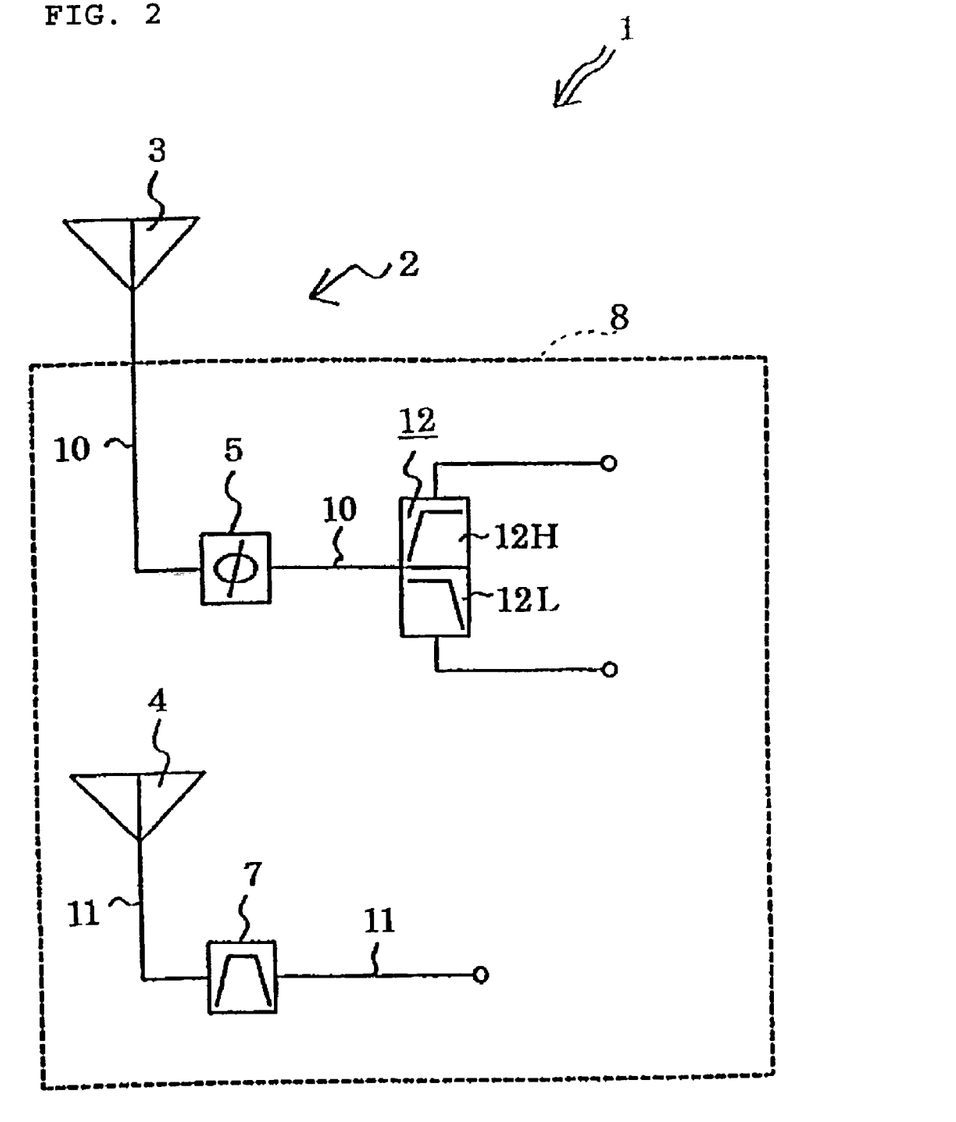
FIG. 2 illustrates a signal-reception circuit according to a second preferred embodiment of the present invention.

A communication device according to the second preferred embodiment is a portable telephone having a GPS function as well as that of the first preferred embodiment. The signal-reception circuit of the communication device of the second preferred embodiment has substantially the same configuration as that of the first preferred embodiment as shown in FIG. 2. Especially, the signal-reception circuit 2 of the second preferred embodiment is different from that of the first preferred embodiment in that a diplexer 12 is provided instead of the trap filter 6. In the description of the second preferred embodiment, the same components or parts as those of the first preferred embodiment are designated by the same reference numerals, respectively. The repeated description is omitted.

In the second preferred embodiment, the diplexer 12 includes the combination of a high-pass filter 12H and a low-pass filter 12L. The high-pass filter 12H transmits a signal with a frequency which is higher than a set threshold frequency Fsh. In the second preferred embodiment, the threshold frequency Fsh is preferably higher than the reception frequency band of the sub-antenna 4 (higher than the GPS frequency band in the second preferred embodiment) and be lower than the PCS frequency band. Thus, according to the second preferred embodiment, the PCS signal of a reception signal of the main antenna 3 is transmitted through the high-pass filter 12H.

The low-pass filter 12L transmits a signal with a frequency which is lower than a set threshold frequency Fsl. In the second preferred embodiment, the threshold frequency Fsl is preferably lower than the reception frequency band of the sub-antenna 4 (GPS frequency band) and be higher than the AMPS frequency band. According to the second preferred embodiment, the AMPS signal of the reception signal of the main antenna 3 is transmitted through the low-pass filter 12L.

In particular, according to the second preferred embodiment, the diplexer 12 interrupts the GPS signal of the reception signal of the main antenna 3 and separates the remaining PCS and AMPS signals from each other. The separated PCS and AMPS signals are output toward the signal-processing units, respectively.

According to the second preferred embodiment, the diplexer 12 is provided instead of the trap filter 6. The diplexer 12 not only interrupts the GPS signal but also separates the PCS and AMPS signals from each other. Therefore, it is not necessary to provide a circuit for separating the PCS and AMPS signals from each other at a subsequent stage of the diplexer 12, that is, on the side near the signal processing units of the diplexer 12. Thus, the circuit configuration of the portable telephone is simplified.

Hereinafter, a third preferred embodiment of the present invention will be described.

Figure 3:
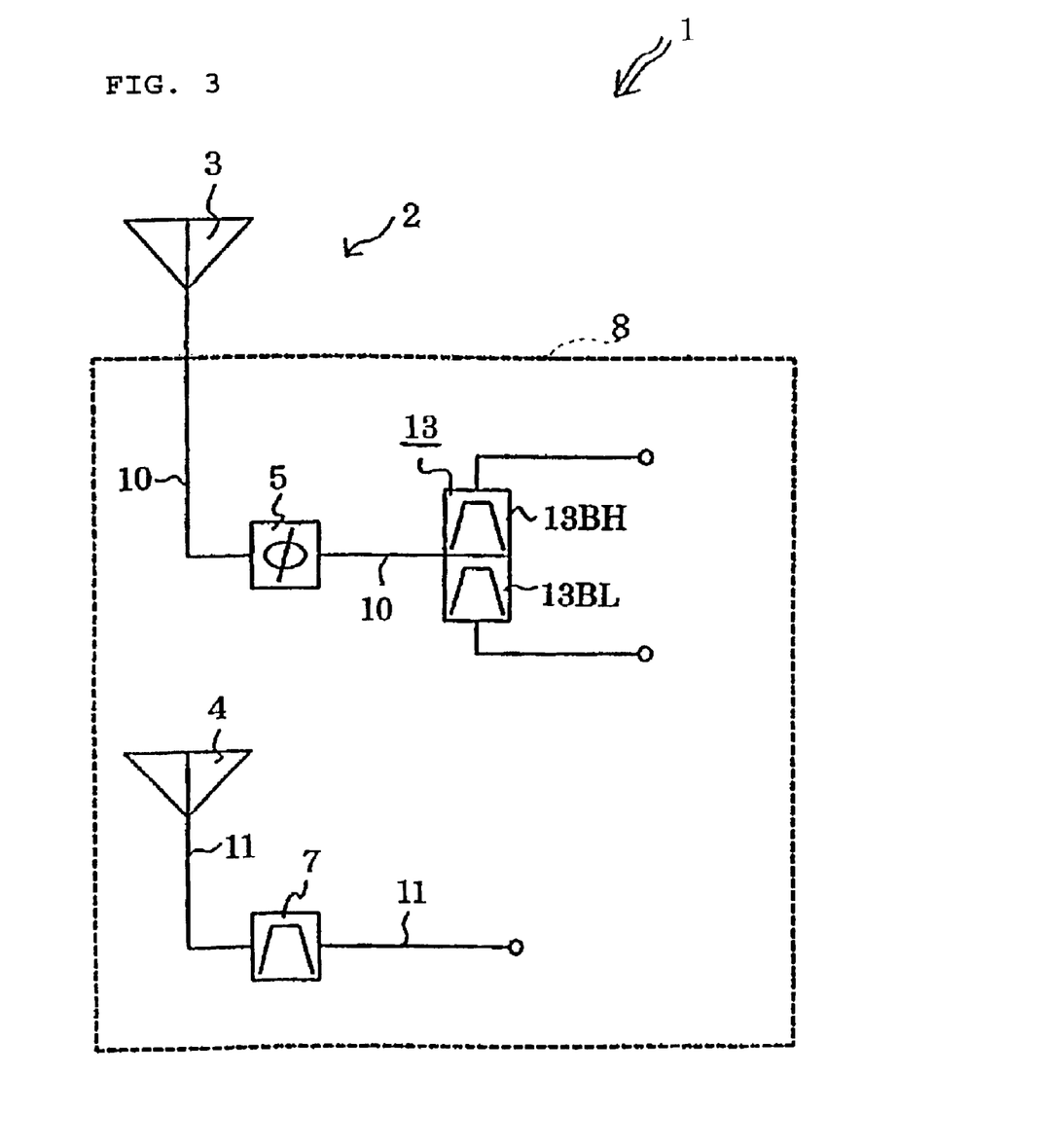
FIG. 3 illustrates a signal-reception circuit according to a third preferred embodiment of the present invention.

According to the third preferred embodiment, as shown in FIG. 3, a diplexer 13 is provided as a filter for interrupting a signal in the same frequency as the reception frequency band of the sub-antenna 4, and includes the combination of two band-pass filters 13BH and 13BL. The other configuration is substantially the same as that of the second preferred embodiment. In the third preferred embodiment, the same components or parts as those of the second preferred embodiment are designated by the same reference numerals, and the repeated description is omitted.

The band-pass filter 13BH transmits a signal (PCS signal according to the third preferred embodiment) in the high frequency band of the three bands, that is, low, middle, and high frequency bands of the main antenna 3, and interrupts signals in the other frequency bands (GPS and AMPS signals). On the other hand, the band-pass filter 13BL transmits a signal (AMPS signal) in the low frequency band, and interrupts signals (GPS and PCS signals) in the other, that is, middle and high frequency bands.

According to the third preferred embodiment, the diplexer 13 interrupts the GPS signal of a reception signal of the main antenna 3, and separates the remaining PCS and AMPS signals from each other, similarly to the second preferred embodiment. The separated PCS and AMPS signals are output toward the signal-processing units, respectively. It is not necessary to provide a wave-separation circuit at a subsequent stage of the diplexer 12, that is, on the side near the signal processing units of the diplexer 13, due to the signal-separating function of the diplexer 13. Thus, the circuit configuration of the portable telephone is simplified.

Hereinafter, a fourth preferred embodiment of the present invention will be described. In the description of the fourth preferred embodiment, the same components or parts as those in the first to third preferred embodiments are designated by the same reference numerals, and the repeated description is omitted.

Figure 4:
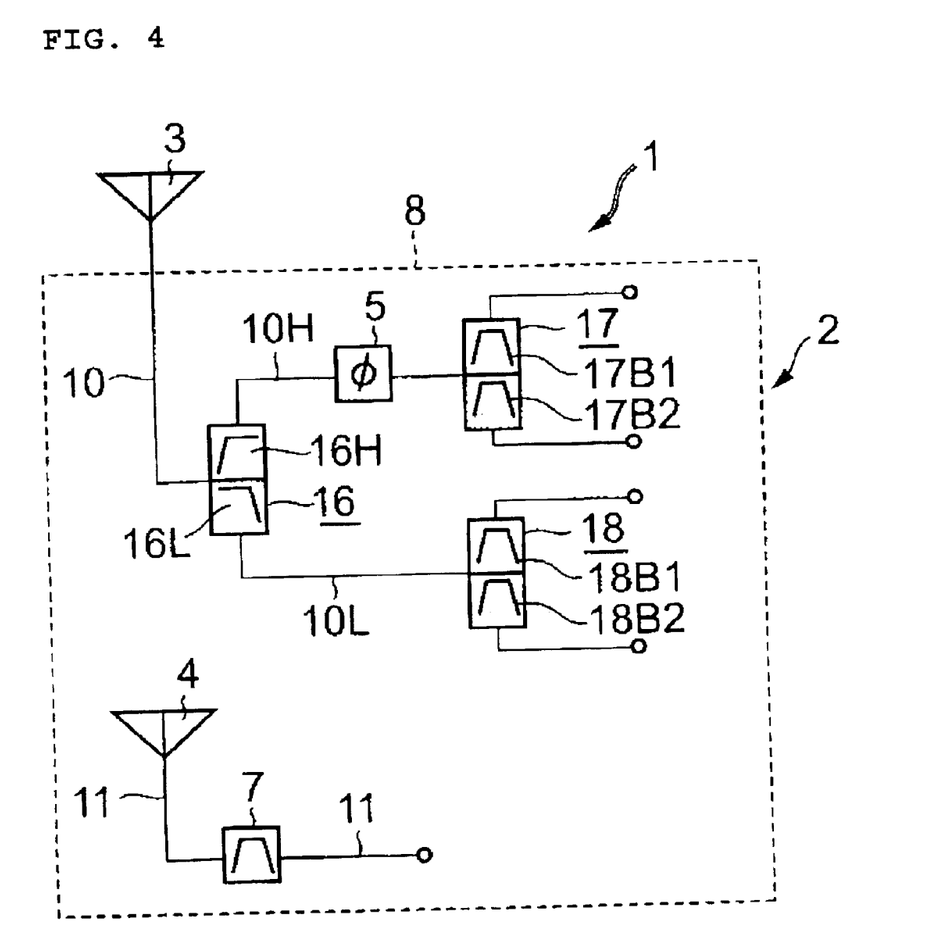
FIG. 4 illustrates a signal-reception circuit according to a fourth preferred embodiment of the present invention.
Figure 5:
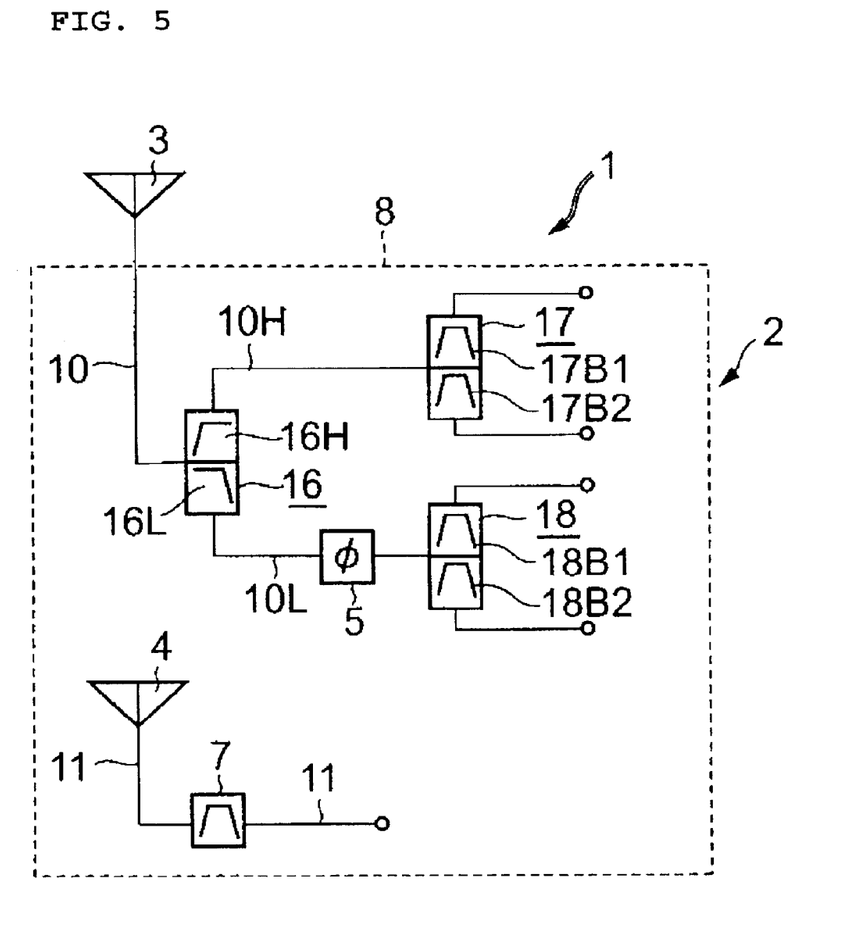
FIG. 5 illustrates a signal-reception circuit according to the fourth preferred embodiment of the present invention.

In the fourth preferred embodiment, a wave-separating unit 16 including a diplexer is provided on a signal line for a reception signal of the main antenna 3, as shown in FIGS. 4 and 5. The wave-separating unit 16 includes the combination of a high-pass filter 16H and a low-pass filter 16L.

In the example of FIG. 4, the high-pass filter 16H transmits a signal with a frequency that is higher than a set threshold frequency which is lower than the reception frequency band (in this case, GPS frequency band) of the sub-antenna 4. Thus, the high-pass filter 16H transmits the PCS and GPS signals.

The low-pass filter 16L of FIG. 4 transmits a signal with a frequency lower than a set threshold frequency which is lower than the reception frequency band (GPS frequency band) of the sub-antenna 4. Thus, the low-pass filter 16L transmits the AMPS signal.

Thus, a reception signal of the main antenna 3 is wave-separated by the above-described high-pass filter 16H and the low-pass filter 16L into the signals (the mixed signal composed of the PCS and GPS signals) including the signal in the reception frequency band of the sub-antenna 4, and the signal (AMPS signal) not including the signal in the reception frequency band of the sub-antenna 4. From the high-pass filter 16H of the diplexer 16, the signals including the signal in the reception frequency band of the sub-antenna 4 are output. The signal not including the signal in the reception frequency band of the sub-antenna 4 is output from the low-pass filter 16L of the diplexer 16.

The phasing circuit 5 and a duplexer 17 as a filter are provided on a signal line 10H in order. Along the signal line 10H, the signals including the signal in the reception frequency band of the sub-antenna 4 output from the high-pass filter 16H are transmitted from the high-pass filter 16H.

In this example, the duplexer 17 includes the combination of band-pass filters 17B1 and 17B2, and is configured so as to interrupt a signal in the reception frequency band of the sub-antenna 4 and transmit signals in the selected frequency bands. It should be noted that the frequency band for a PCS reception signal is slightly different from that for a PCS transmission signal. Considering this, one of the band-pass filters 17B1 and 17B2 of the duplexer 17 is configured so as to transmit a signal in the frequency band for PCS signal reception and interrupt signals in the other frequency bands. The other band-pass filter is configured so as to transmit a signal in the frequency band for PCS signal transmission and interrupt signals in the other frequency bands.

Regarding the AMPS, the frequency band for AMPS signal reception is slightly different from that for AMPS transmission signal. Considering this, a duplexer 18 including band-pass filters 18B1 and 18B2 is provided on a signal line 10L. Along the signal line 10L, an AMPS signal output from the low-pass filter 16L of the diplexer 16 is transmitted. One of the band-pass filters 18B1 and 18B2 of the duplexer 18 is configured so as to transmit a signal in the frequency band for AMPS reception and interrupt signals in the other frequency bands. The other band pass filter is configured so as to transmit a signal in the frequency band for AMPS signal transmission and interrupt signals in the other frequency bands.

According to the example of FIG. 4, the GPS signal received by the main antenna 3 and being in the same frequency band as the reception frequency band of the sub-antenna 4 is transmitted through the high-pass filter 16H of the diplexer 16 to reach the duplexer 17, and is reflected by the duplexer 17. For the filter reflection signal, the phase of it is adjusted by the phasing circuit 5, and is induced in the sub-antenna 4.

According to the example shown in FIG. 5, the high-pass filter 16H of the diplexer 16 is configured so as to transmit the PCS signal, but filter the signal in the reception frequency band of the sub-antenna 4. The low-pass filter 16L is configured so as to transmit GPS and AMPS. The phasing circuit 5 and the duplexer 18 are provided on a transmission line 10L in order. The transmission line 10L was provided for the signals output from the low-pass filter 16L and including the signal in the reception frequency band of the sub-antenna 4. The configurations of the duplexers 17 and 18 are substantially the same as those of FIG. 4.

According to the example of FIG. 5, the GPS signal received by the main antenna 3 and being in the same frequency band as the reception frequency band of the sub-antenna 4 is transmitted through the low-pass filter 16L of the diplexer 16 to reach the duplexer 18, and is reflected by the duplexer 18. The filter reflection signal, after the phase is adjusted by the phasing circuit 5, is induced in the sub-antenna 4.

According to the fourth preferred embodiment, the filters (duplexers 17 and 18) for interrupting the signal in the reception frequency band of the sub-antenna 4 are provided on the signal lines following the wave-separating unit 6 for separating a reception signal of the main antenna 3. The phasing circuit 5 is provided between the wave-separating unit 16 and one of the filters. With this configuration, advantages which are as excellent as those of the first to third preferred embodiments are obtained.

Hereinafter, a fifth preferred embodiment of the present invention will be described. In the description of the fifth preferred embodiment, the same components and parts as those of the first to fourth preferred embodiments are designated by the same reference numerals. The repeated description is omitted.

Figure 6:
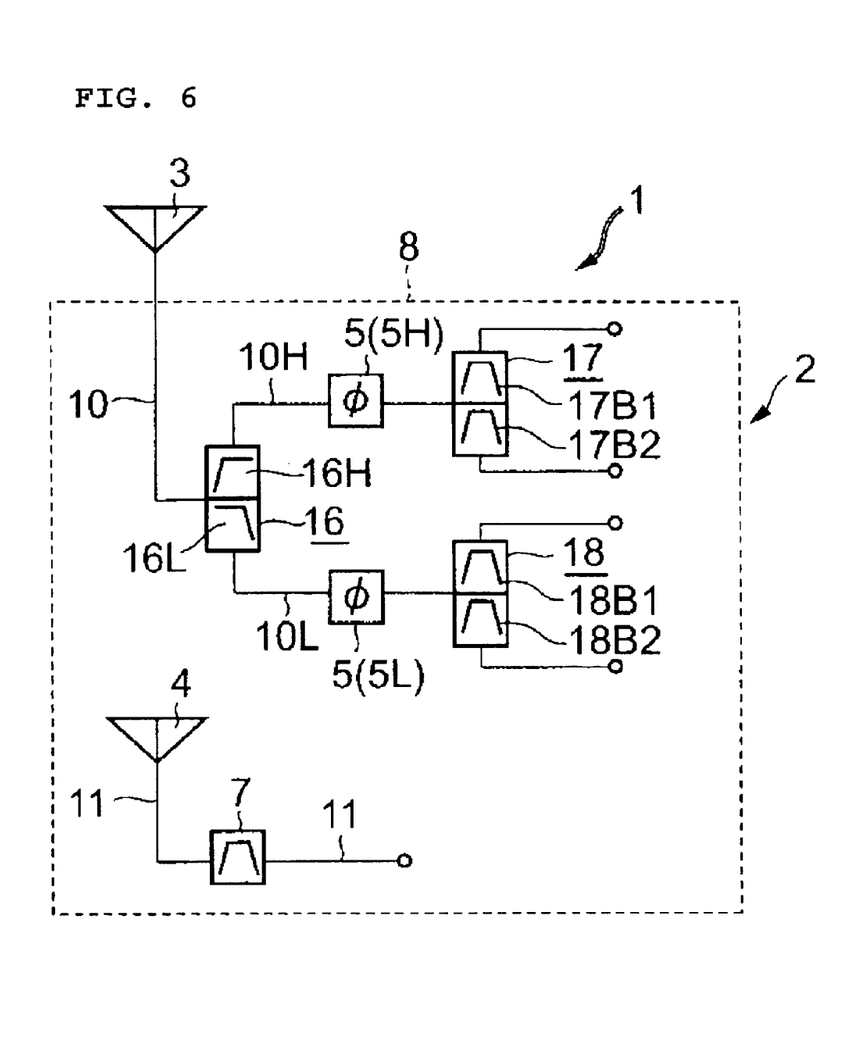
FIG. 6 illustrates a signal-reception circuit according to a fifth preferred embodiment of the present invention.

In the fifth preferred embodiment, the diplexer 16 including the high-pass filter 16H and the low-pass filter 16L is provided on the transmission line for a reception signal of the main antenna 3 as shown in FIG. 6. The diplexer 16 is configured so that both of signals output from the high pass filter 16H and signals output from the low-pass filter 16L include the signal in the reception frequency band of the sub-antenna 4, respectively. That is, the high-pass filter 16H transmits the PCS and GPS signals. The low-pass filter 16L transmits the GPS and AMPS signals.

The phasing circuit 5 (5H) and subsequently the duplexer 17 are provided on the signal line 10H along which the signals output from the high-pass filter 16H are transmitted. On the other hand, the phasing circuit 5 (5L) and subsequently the duplexer 18 are provided on the signal line 10L along which the signals output from the low-pass filter 16L are transmitted.

With the configuration of the fifth preferred embodiment, the same advantages as those of each of the first to fourth preferred embodiments are obtained.

Hereinafter, a sixth preferred embodiment of the present invention will be described. In the description of the sixth preferred embodiment, the same components or parts as those of each of the first to fifth preferred embodiments are designated by the same reference numerals. The repeated description is omitted.

Figure 7:
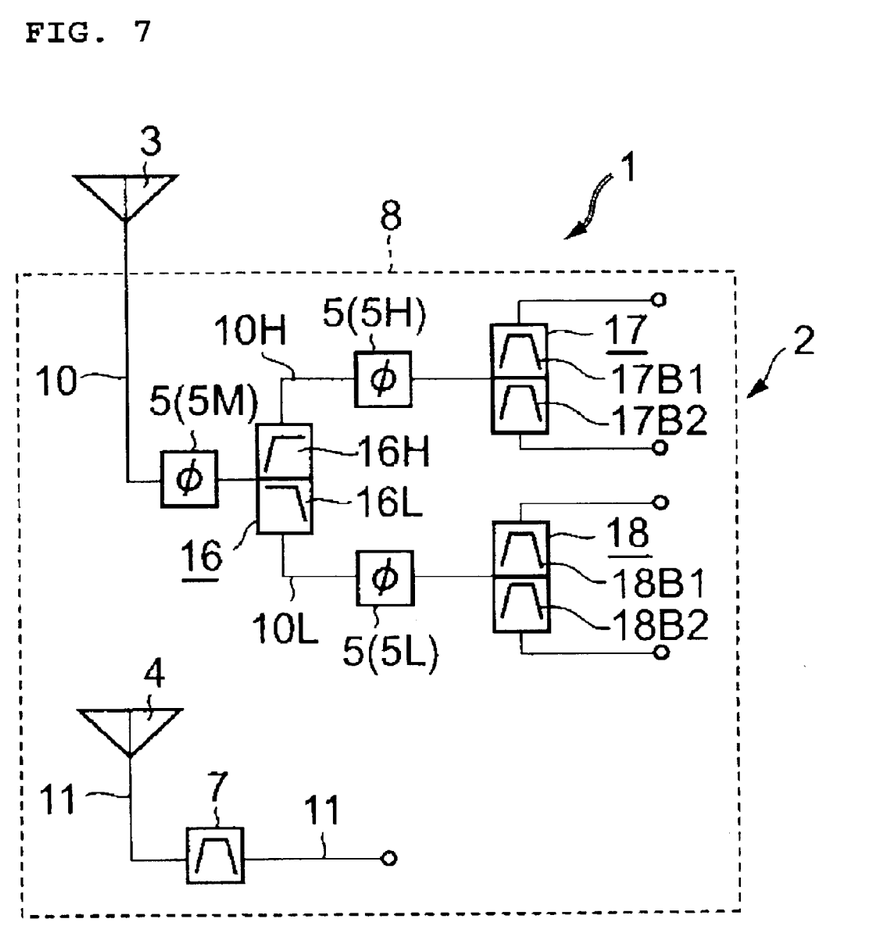
FIG. 7 illustrates a signal-reception circuit according to a sixth preferred embodiment of the present invention.

In the sixth preferred embodiment, the phasing circuit 5 (5M) is provided on the signal line 10 between the main antenna 3 and the diplexer 16 in addition to the configuration of the fifth preferred embodiment, as shown in FIG. 7. Therefore, for the GPS signal in the reception frequency band of the sub-antenna 4 which are reflected by the duplexers 17 and 18 as filters, the phases thereof are adjusted in two steps, that is, by the phasing circuits 5H or 5L, and the phasing circuit 5M, respectively, and then, the signals are induced in the sub-antenna 4.

According to the sixth preferred embodiment, the same advantages as those of each of the first to fifth preferred embodiments are obtained.

The present invention is not restricted to the first to sixth preferred embodiments. According to the present invention, various preferred embodiments are available. For example, according to the first to sixth preferred embodiments, the signal-reception circuit 2 receives signals in the three different frequency bands and outputs the signals towards the respective signal-processing units. For example, the circuit 2 may be configured so as to receive signals in two frequency bands. In this case, e.g., the main antenna 3 is configured so as to receive signals in two different frequency bands A and B, while the sub-antenna 4 is configured so as to receive a signal in one (e.g., frequency band A) selected from the frequency bands A and B. A filter for interrupting the signal in the same frequency band as the reception frequency band (frequency band A) of the sub-antenna 4 is provided on the signal line 10 of the main antenna 3. In this case, the trap filter 6 as used in the first preferred embodiment may be used as the filter. Further, a high pass filter shown in FIG. 8A or a low-pass filter 15 shown in FIG. 8B may be used, since the number of the reception frequency bands of the main antenna 3 is two. The high-pass filter 14 or the low-pass filter 15 is used, depending on which frequency band A or B is higher (or lower).

Moreover, a band-pass filter which interrupts the signal in the same frequency band as the reception frequency band (frequency band A) of the sub-antenna 4 and transmits the signal in the other frequency band B may be provided instead of the high-pass filter 14 and the low-pass filter 15.

In the case in which the number of the reception frequency bands of the main antenna 3 is two as described above, one filter is arranged so that a reception signal of the main antenna 3 is wave-separated into the signals in the frequency bands A and B. Accordingly, it is not necessary to provide a wave-separation circuit on the side near the signal processing units of the filter.

Moreover, the number of the frequency bands in which the signal-reception circuit 2 receives signals may be four or more. In this case, e.g., the main antenna 3 is configured so as to receive signals in at least four set reception frequency bands. The sub-antenna 4 is configured so as to receive a signal in one reception frequency band selected from the at least four reception frequency band. A filter for interrupting the signal in the same frequency band as the reception frequency band of the sub-antenna 4 is provided on the transmission line 10 for a reception signal of the main antenna 3. Moreover, a circuit for wave-separating the signals in the frequency bands, respectively, is provided on the signal line 10. The wave-separation circuit has a circuit configuration excluding a triplexer. Thereby, deterioration of the reception signal, which may be caused by the large insertion loss of the triplexer, is prevented.

Figure 8A:
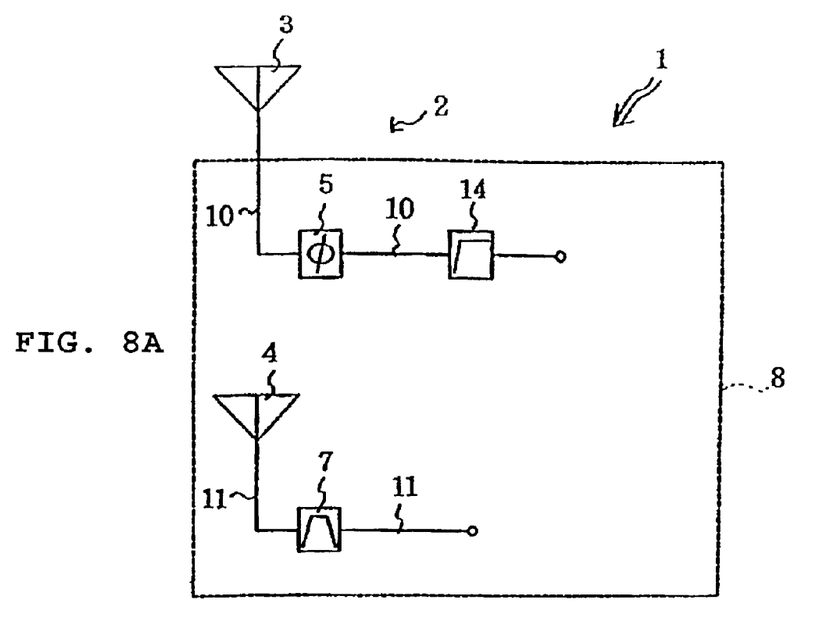
FIG. 8 illustrates a signal-reception circuit according to another preferred embodiment of the present invention.
Figure 8B:
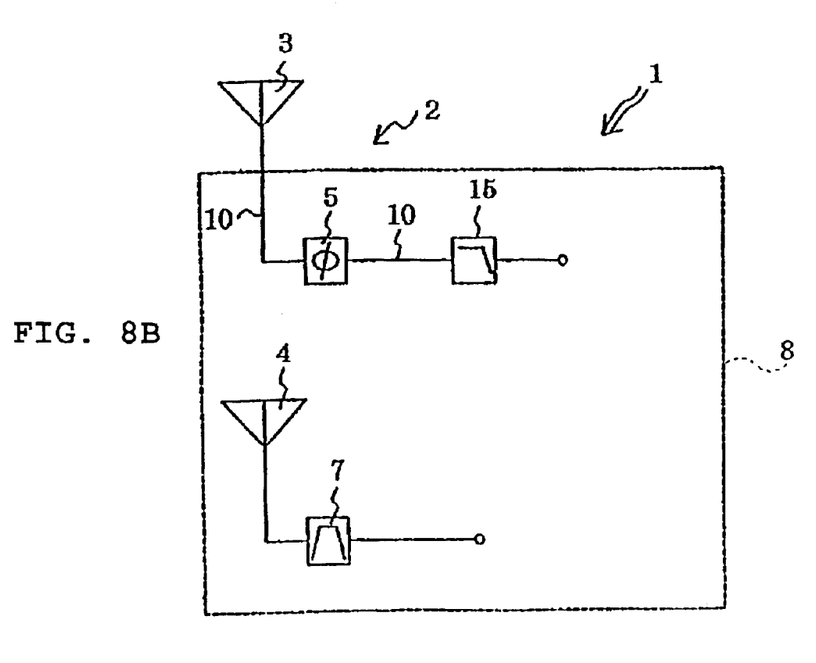

According to the first to sixth preferred embodiments, the reception frequency band of the sub-antenna 4 is the middle reception frequency band (GPS frequency band) of the three bands, that is, high, middle and low reception frequency bands. However, for example, the high reception frequency band (PCS frequency band) may be used instead of the middle reception frequency band. Also, the low reception frequency band (AMPS frequency band) may be used. For example, in the case in which the reception frequency band of the sub-antenna 4 is the high reception frequency band, the low-pass filter 15 may be used instead of the trap filter 6 used in the first preferred embodiment as shown in FIG. 8B. Also, in the case in which the reception frequency band of the sub-antenna 4 is the low reception frequency band, the high-pass filter 14 may be used instead of the trap filter 6 used in the first preferred embodiment, as shown in FIG. 8A.

Moreover, according to the first to sixth preferred embodiments, the communication device 1 receives PCS, GPS and AMPS signals. However, the combination of frequency bands in which signals are received is not restricted to that for the PCS, GPS, and AMPS signals. Moreover, in the respective preferred embodiments, a portable telephone is preferably used as the communication device 1. However, the communication device of the present invention is not restricted to the portable telephone.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A signal-reception circuit which receives radio signals in at least two different frequency bands and outputs the signals to signal processing units, the signal-reception circuit comprising:
   a main antenna for receiving signals in at least two different frequency bands;
   a sub-antenna for receiving signals in one of the at least two reception frequency bands of the main antenna, the main antenna and the sub-antenna being coupled to each other;
   a filter arranged to interrupt the signal in the same frequency band as the reception frequency band of the sub-antenna and arranged on a signal line along which a signal is transmitted from the main antenna to a signal-processing unit, wherein the filter reflection signal in the same frequency band as the reception frequency band of the sub-antenna is induced in the sub-antenna by the antenna coupling, and the composite signal of the induced signal and the reception signal of the sub-antenna is output from the sub-antenna to another signal-processing unit;

a phase shifter provided on a signal line between the main antenna and the filter, wherein the phase shifter adjusts the phase of the filter reflection signal so that the signal induced in the sub-antenna is put substantially in phase with the reception signal of the sub-antenna to improve the level of the signal to be transmitted from the sub-antenna to the signal-processing unit.

2. A signal-reception circuit according to claim 1, wherein the filter includes a trap filter for transmitting a signal in the frequency band excluding the reception frequency band of the sub-antenna.

3. A signal-reception circuit according to claim 1, wherein the filter includes a high-pass filter for transmitting a signal with a frequency higher than a set threshold frequency which is higher than the reception frequency band of the sub-antenna.

4. A signal-reception circuit according to claim 1, wherein the filter includes a low-pass filter for transmitting a signal with a frequency lower than a set threshold frequency which is lower than the reception frequency band of the sub-antenna.

5. A signal-reception circuit according to claim 1, wherein a band-pass filter for transmitting a signal in a set frequency band excluding the reception frequency band of the sub-antenna.

6. A signal-reception circuit according to claim 1, wherein the main antenna is configured so as to receive signals in three different frequency bands, and the filter includes the combination of a band-pass filter for transmitting a signal in one of the two reception frequency bands that is different from the reception frequency band of the sub-antenna and a band-pass filter for transmitting a signal in the other reception frequency band.

7. A signal-reception circuit according to claim 1, wherein the main antenna is configured so as to receive signals in three different frequency bands, the middle reception frequency band of the three bands including low, middle and high reception frequency bands is the same as the reception frequency band of the sub-antenna, and the filter includes a diplexer including a combination of a low-pass filter for transmitting the signal in the low reception frequency band of the main antenna and interrupting the signals in the other two reception signal frequency bands, and a high-pass filter for transmitting the signal in the high reception signal frequency band and interrupting the signals in the other two reception frequency bands.

8. A signal-reception circuit according to claim 1, wherein the main antenna is configured so as to receive signals in three different frequency bands, a wave-separating unit including a diplexer for wave-separating a reception signal of the main antenna into signals including a signal in the same frequency band as the reception frequency band of the sub-antenna and a signal not including the signal in the same frequency band as the reception frequency band of the sub-antenna is provided on a signal line for transmitting a reception signal from the main antenna toward a signal-processing unit, and a phasing circuit and a filter are provided on a transmission line for the signals wave-separated by the wave-separating unit and including the signal in the same frequency band as the reception frequency band of the sub-antenna.

9. A signal-reception circuit according to claim 1, wherein the main antenna is configured so as to receive signals in at least three different frequency bands, and a diplexer including the combination of a high-pass filter for transmitting signals with frequencies higher than a set threshold frequency which is lower than the reception frequency band of the sub-antenna, and a low-pass filter for transmitting signals with frequencies lower than a set threshold frequency which is higher than the reception frequency band of the sub-antenna is provided on the signal line for transmitting a reception signal from the main antenna toward the signal-processing unit, wherein the reception signal of the main antenna is wave-separated by the diplexer, and a phase shifter and subsequently a filter are provided on each signal line where each signal wave-separated by the diplxer is transmitted.

10. A signal-reception circuit according to claim 9, further comprising a phase shifter arranged to adjust the phase of a filter reflection signal and being provided on the signal line between the main antenna and the diplexer.

11. A communication device comprising a signal-reception circuit according to claim 1.

12. A communication device according to claim 11, wherein the main antenna is arranged so as to project outward of a casing of the communication device, and the sub-antenna is disposed in the casing.

13. A communication device according to claim 11, wherein the sub-antenna is configured so as to receive a Global Positioning System signal, and the communication device is a portable telephone having a Global Positioning System function.

14. A signal-reception circuit according to claim 1, wherein the main antenna is configured so as to receive signals in four different frequency bands.

15. A signal-reception circuit according to claim 1, wherein the filter is arranged so that a reception signal of the main antenna is wave-separated into signals in at least two frequency bands.

16. A signal-reception circuit according to claim 1, wherein the filter is one of a trap filter, a high pass filter and a low-pass filter.

* * * * *